United States Patent Office 3,020,161
Patented Feb. 6, 1962

3,020,161
PROCESS FOR REMOVAL OF RADIONUCLIDES FROM MILK
Gopala K. Murthy and Jeptha E. Campbell, Jr., Cincinnati, Ohio, Edmund B. Masurovsky, College Park, Md., and Locke F. Edmondson, Arlington, Va.; said Edmondson assignor to the United States of America as represented by the Secretary of Agriculture; said Murthy, Campbell, and Masurovsky assignors to the United States of America as represented by the United States Atomic Energy Commission
No Drawing. Filed Jan. 19, 1961, Ser. No. 83,850
4 Claims. (Cl. 99—54)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the removal of radioactive materials from milk.

Radioactive fallout presents many problems, one of considerable importance being the occurrence in milk of radioactive cations which were present in or on the food and water injested by an animal, such as the cow, goat, sheep, or mare. Currently reported procedures for removing radioactive cations from milk have one or more of the following disadvantages: limited removal of radioactive cations, impractical commercial applicability, or giving a product in which the flavor and physical characteristics of the milk have been adversely affected. The process of the present invention combines efficient removal of radioactive cations with a product which is comparable to the original milk in flavor and in physical and chemical characteristics.

An object of the present invention is to remove radioactive cations from milk. Another object is to remove radioactive cations from milk by a process which results in a milk having substantially the same final cationic composition in regard to non-radioactive cations as that of the original milk. Other objects and a fuller understanding of the invention may be had by referring to the following description and claims.

In general according to the present invention radioactive cations such as strontium-90, strontium-89, barium-140 and cesium-137 are removed from milk with a cation exchange resin under controlled conditions of pH and of non-radioactive cation balance by the following process. The cationic composition and the pH of the milk to be processed are determined on a representative aliquot. The milk is adjusted to a pH in the range of about 5 to 6, preferably in the range of about 5.2 to 5.4, with an edible organic acid such as citric or lactic acid. An aqueous salt solution of the same non-radioactive cations which it is desired to retain in the milk, and in proportions substantially the same as determined for the milk to be processed, is prepared and adjusted to substantially the same pH as that of the acidified milk. A cation exchange resin is contacted with the aqueous cation solution until the resin is charged, that is, is in equilibrium with cations in solution. The charged resin is washed with distilled water to remove excess salts. The acidified milk is contacted with the charged resin to remove radioactive cations from the milk, and then the milk is adjusted to its original pH, thus providing an acceptably flavored product essentially free of radioactive cations.

The acidified, essentially radioactive cation free milk may be adjusted to the pH of the original milk by contacting with an anion exchange resin in the hydroxyl cycle. By this procedure the final milk product has a non-radioactive cationic composition comparable to that of the original milk.

An alternative procedure for adjusting the pH of the acidified cation exchange resin treated milk to the pH of the original milk is by adding an alkaline hydroxide, such as potassium hydroxide, and, while this procedure results in a change in the proportions of non-radioactive cations in the final product, this does not materially detract from the acceptability of the processed milk.

In those processes in which an acidified milk is desirable as the starting material, the acidified, essentially radioactive cation free milk may be used directly or with only a slight modification of pH.

Strontium and barium are distributed between the serum and colloidal phases of milk. That portion bound to the colloidal phase is not readily available for ion exchange, thus imposing a limitation on the practical removal of these radionuclides by ion exchange processes alone. By the process of the present invention this limitation is substantially overcome. The increase in removal of strontium-90 is attributed to the act of lowering the pH of the milk, shifting the equilibrium so that more of these cations are free to be exchanged when the milk is contacted with cation exchange resins. Although this process has been designed to overcome the problem of "bound" cations in milk, it is also effective for the removal of such "free" ionic species as cesium-137.

The cation-exchange resins used in this process are of the sulfonic acid type, for example, nuclear sulfonic acid or methylene sulfonic acid. Cation-exchange resins of the carboxylic acid type are likewise considered applicable for this process.

A typical milk contains calcium, sodium, potassium and magnesium ions in amounts of about 1.25, 0.5, 1.5, and 0.125 grams per liter, respectively. It has been found that charging a cation exchange resin with an aqueous solution containing appropriate concentrations of the aforementioned cations, under conditions which provide for the physico-chemical optima for charging, that is, conditions such as resin contact time, pH and temperature, and combinations thereof as illustrated in the examples, results in a cation charged resin which removes strontium, barium, and cesium cations while maintaining an equilibrium exchange of calcium, sodium, potassium and magnesium cations with the milk. Charging the cation exchange resin with the latter cations at a pH adjusted to that of the milk to be processed eliminates any variation in equilibrium exchange of cations which might occur due to differences in pH.

The anion exchange resin utilized in this process is of a strongly basic character, possessing a quaternary ammonium type of structure, for example, a type II base.

The cationic equilibrium obtainable between acidified milk and the charged cation exchange resin is now illustrated.

EXAMPLE 1

A representative aliquot of a lot of raw, whole milk was analyzed by flame photometry and found to contain calcium, potassium and sodium in amounts of 1.313, 1.706 and 0.438 grams per liter of milk, respectively. The lot of milk was adjusted to pH 5.4 by addition of 0.5 molar citric acid.

The cation exchange resin, a nuclear sulfonic acid type with polystyrene matrix (Amberlite IR–120 H, 20–50 mesh analytical grade), was fully hydrated, cycled and sorted, and 350 ml. was poured into a 1½ inch diameter glass tube to give a column of resin about 12 inches in height. The resin was charged downflow at room temperature (about 24° C.) with a flow rate of 25 ml. per minute with a mixed chloride salt solution containing 13.13, 17.06, and 4.38 grams per liter, respectively of calcium, potassium, and sodium cations. The charged resin was washed down flow with 7 liters of distilled water at room temperature with a flow rate of 50 ml. per minute, removing excess salt solution.

The acidified milk was passed through the charged resin column downflow at about 24° C. at a flow rate of 50 ml. per minute. Samples, 100 ml. each, were collected as the last portion of every two liters passing through the column. The results of flame spectrophotometric analyses of these samples are presented in Table I.

TABLE I

*Calcium, potassium and sodium analyses of milk before and after contacting with cation exchange resin*

| Volume through resin column | Analysis | | |
|---|---|---|---|
| | Calcium, grams per liter | Potassium, grams per liter | Sodium, grams per liter |
| liters: | | | |
| 0 [1] | 1.313 | 1.706 | 0.438 |
| 2 | 0.797 | 1.853 | 0.531 |
| 4 | 1.195 | 2.023 | 0.469 |
| 6 | 1.313 | 1.779 | 0.450 |
| 8 | 1.313 | 1.706 | 0.438 |
| 10 | 1.313 | 1.706 | 0.438 |
| 12 | 1.313 | 1.706 | 0.438 |

[1] Control assay on original milk.

The results indicate that an equilibrium exchange for these cations was established after about 4 liters of milk had passed through the cation exchange column.

Examples 2 and 3 are presented in illustration of the invention but are not intended to be limitations thereof. Strontium-85 was used as a matter of convenience and is considered equivalent for ion exchange purposes to other divalent strontium ions such as strontium-90 and strontium-85.

EXAMPLE 2

A cation exchange column was prepared exactly as described in Example 1. To raw, whole milk having the calcium, potassium and sodium content of that of Example 1 was added 1.5 $\mu$c. (microcurie) $SR^{85}Cl_2$ (CF) liter of milk. The milk containing the radioactive strontium was mixed thoroughly and allowed to stand at 5° C. for 72 hours so that the added strontium would attain a distribution between the serum and colloidal phases of the milk in the same proportions as are found in in vivo labelled milk, then adjusted to pH 5.4 with 0.5 molar citric acid solution.

The acidified milk was passed through the charged cation exchange resin column at room temperature (about 24° C.) at the rate of 50 ml. per minute. Samples of 100 ml. milk were collected as every two liters passed through the column.

Gamma-ray emissions from strontium-85 were determined for controls (samples taken before passing through cation exchange resin), background samples, and for each sample of milk through the column. For these determinations 4 ml. of milk was pipetted into a 16 mm. diameter test tube and the test tube placed in the well of a NaI(Th) scintillation crystal detector assembly (Nuclear-Chicago Model DS–XT2WO) electronically coupled to a gamma-ray analyzer computer (Nuclear-Chicago Model 132A).

Determinations were made in triplicate and the average result from removal of radioactivity presented in Table II.

TABLE II

*Removal of strontium-85 from milk*

| Milk passed through column liters: | Removal of strontium-85 percent |
|---|---|
| 0 (control) | 0 |
| 2 | 92 |
| 4 | 92 |
| 6 | 92 |
| 8 | 92 |
| 10 | 92 |
| 12 | 92 |
| 14 | 90 |
| 16 | 80 |
| 18 | 72 |

The cation exchange resin removed 92% of the strontium until 12 liters of milk passed through the column. The subsequent decrease in effectiveness is due to the cation exchange resin becoming exhausted.

EXAMPLE 3

In vivo labelled milk was obtained from a Holstein cow which received one millicurie of radioactive strontium per day, administered orally in a solution of strontium nitrate in a gelatin capsule. Milk from this cow, assaying 1.1 $\mu$c. strontium-85 liter was processed as described in Example 2. Calculations based on gamma-ray emission determinations of the milk before and after passing through a column of charged cation exchange resin showed that 90 to 92% of the strontium-85 was removed from the acidified milk.

The following example is included to demonstrate the effect of the inventive process on the flavor of milk which has been restored to its original pH.

EXAMPLE 4

Four ion exchange columns, A, B, C, and D were prepared by charging each with an aqueous solution containing 37 grams of $CaCl_2$, 31.1 grams of KCl, 11.5 grams of NaCl, and 5 grams of $MgCl_2$ per liter. The pH of the charging solution for each column, A, B, C, and D was adjusted to 5.4, 5.8, 6.2, and 6.6, respectively. The excess salt solution was removed by washing with water. A quantity of whole raw milk (pH 6.68) was divided into four lots, A, B, C, and D. Lot A was adjusted to a pH of 5.4, lot B to a pH of 5.8, and lot C to a pH of 6.2 with half molar citric acid. The pH of lot D was not altered. Samples of each lot before and after contacting with cation exchange resin were collected. The samples collected before resin contact (except sample D) were neutralized to the original pH by contacting with anion exchange resin in the hydroxyl cycle. After contacting with the cationic exchange resin, lots A, B, and C were divided into two sub-lots. One sub-lot of each was neutralized with anion exchange resin as described above, and the other by the direct addition of half molar KOH. Lot D required no neutralization before or after cationic resin contact. The resin used for anion exchange neutralization was removed by filtration. All samples were pasteurized at 145° F. for 30 minutes and submitted to a taste panel of 10 expect judges. A sample of original lot D (no resin contact) served as a control. The flavor scores are shown in Table III. The scoring system used was a modification of that approved by the American Dairy Science Association for judging milk.

TABLE III

*Effect of contact of milk with ion exchange resins on flavor scores*

| Lot | pH | Cation Exchange Resin Contact | Method of Restoring Original pH | Average Flavor Score |
|---|---|---|---|---|
| A | 5.4 | No | Anion exchange resin | 35.5 |
| B | 5.8 | No | do | 36.0 |
| C | 6.2 | No | do | 36.2 |
| D | 6.68 | No | None | 36.6 |
| A | 5.4 | Yes | Anion Exchange resin | 36.0 |
| A | 5.4 | Yes | Addition of KOH | 35.8 |
| B | 5.8 | Yes | Anion exchange resin | 36.0 |
| B | 5.8 | Yes | Addition of KOH | 35.9 |
| C | 6.2 | Yes | Anion exchange resin | 35.2 |
| C | 6.2 | Yes | Addition of KOH | 35.6 |
| D | 6.68 | Yes | None | 36.1 |

The data indicate that the organoleptic quality of milk treated by this process is comparable to that of normal pasteurized whole milk.

We claim:

1. A process for the removal of cationic radionuclides from a milk comprising determining the pH and the cationic composition of a milk, adjusting the milk to a pH in the range of about from 5 to 6 with an edible organic acid, contacting a cation-exchange resin with an aqueous salt solution of non-radioactive cations in proportions substantially the same as determined for the milk to be processed and at a pH substantially that of the acidified milk until the resin is charged, washing excess salts from the charged resin, contacting the milk with the charged resin to remove radioactive cations from the milk while non-radioactive cations remain in equilibrium between the milk and the charged resin, and restoring the milk to its original pH to give an acceptably flavored milk product essentially free of radionuclides.

2. A process for the removal of cationic radionuclides from a milk comprising determining the pH and the cationic composition of a milk, adjusting the milk to a pH in the range of about from 5 to 6 with an edible organic acid, contacting a cation-exchange resin with an aqueous salt solution of non-radioactive cations in proportions substantially the same as determined for the milk to be processed and at a pH substantially that of the acidified milk until the resin is charged, washing excess salts from the charged resin, contacting the milk with the charged resin to remove radioactive cations from the milk while non-radioactive cations remain in equilibrium, between the milk and the charged resin, contacting the milk from which radioactive cations have been removed with an anion resin in the hydroxyl cycle to restore the pH of the milk to substantially that of the original milk, thus providing a milk product essentially free of radionuclides and having a non-radioactive cationic composition which is substantially that of the milk prior to processing.

3. A process for the removal of cationic radionuclides from a milk comprising determining the pH and the cationic composition of a milk, adjusting the milk to a pH in the range of about from 5 to 6 with an edible organic acid, contacting a cation exchange resin with an aqueous salt solution of non-radioactive cations in proportions substantially the same as determined for the milk to be processed and at a pH substantially that of the acidified milk until the resin is charged, washing excess salts from the charged resin, contacting the milk with the charged resin to remove radioactive cations from the milk while non-radioactive cations remain in equilibrium between the milk and the charged resin, and adding potassium hydroxide to the milk to adjust the pH to that of the original milk to give an acceptably flavored milk product essentially free of radionuclides.

4. A process for the removal of cationic radionuclides from a milk comprising determining the pH and the cationic composition of a milk, adjusting the milk to a pH in the range of about from 5 to 6 with an edible organic acid, contacting a cation exchange resin with an aqueous salt solution of non-radioactive cations in proportions substantially the same as determined for the milk to be processed and at a pH substantially that of the acidified milk until the resin is charged, washing excess salts from the charged resin, and contacting the milk with the charged resin to remove radioactive cations from the milk while non-radioactive cations remain in equilibrium between the milk and the charged resin to give an acidified milk product essentially free of radionuclides and having a non-radioactive cationic composition which is substantially that of the milk prior to processing.

References Cited in the file of this patent

UNITED STATES PATENTS 2,793,953    Loo _____ May 28, 1957

OTHER REFERENCES

Contamination by Radioactive Substances, by Norris & Carrett, J. New England Water Works Assoc., vol. 62, 1948, page 7.

Ion Exchange Resins, by Kumin, published by Wiley & Sons, Inc., N.Y., 1950, pp. 22–25.